United States Patent Office

Re. 24,422
Reissued Feb. 4, 1958

24,422

IRRIGATION FLUID FOR CYSTOSCOPY AND TRANSURETHRAL PROSTATECTOMY

Waldo R. Hardie, Walnut Creek, Calif., assignor to Cutter Laboratories, Berkeley, Calif., a corporation of California No Drawing. Original No. 2,721,825, dated October 25, 1955, Serial No. 303,842, August 11, 1952. Application for reissue September 24, 1957, Serial No. 686,550

2 Claims. (Cl. 167—50)

Matter enclosed in heavy brackets [ ] appears in the original patent but forms no part of this reissue specification; matter printed in italics indicates the additions made by reissue.

This invention relates to and in general has for its object the provision of an aqueous hexitol solution for use by urologists during cystoscopy and transurethral prostatectomy and other similar surgical manipulations.

The use of water as an irrigating fluid during a transurethral resection has been widely criticized (Surg. Gynec. & Obst. 88: 389–398, 1949; J. Urol. 62: 322–327, 1949; J. Urol. 65: 1075–1092, 1951; J. Urol. 62: 168–177, 1949). As the intracystic pressure rises incident to the irrigation procedure, the fluid is easily forced into any open vein or sinus around the prostatic capsule. A large amount of fluid can thus enter the venous circulation unnoticed and, as a result, intravascular hemolysis is almost certain to occur. An excessive hemolysis has often been noted clinically and has resulted in anemia, jaundice, hemoglobinurea, oliguria, lower nephron nephrosis, and occasional death.

The criteria of an ideal irrigating fluid can be stated as follows: It should be isotonic or otherwise non-hemolyzing under the conditions of use; it should be non-ionized and a non-conductor of electricity because of the electrical equipment which is commonly used; it should be non-irritating, nontoxic, sterile, pyrogen-free, of low viscosity, and non-sticky; it should allow the undistorted transmission of light of all visible wavelengths; because as much as thirty or forty liters are often used with one patient[,] the fluid should also be sufficiently economical to be usable in large quantities.

Isotonic salt solutions are obviously unsatisfactory because of their high electrical conductance. The use of sugar solutions has been proposed in the clinical literature, but sugar solutions have been found to be not at all ideal because they are a little viscous and sticky, when in motion they cause visual disturbances, and when concentrated sugar solutions are sterilized by heat[,] they develop a slight but objectionable color. The use of urea solutions has also been proposed, but although a urea solution possesses certain advantages as to vision, the urea immediately and completely hemolyzes the red blood cells and its use is therefore as dangerous if not more dangerous than the use of water. The use of an isotonic glycine solution has also been proposed, and a glycine solution is fairly satisfactory except for three disadvantages:[;] it is not entirely non-conducting; it is not sufficiently soluble to be prepared and distributed as an aqueous concentrate; and it is prohibitively expensive when large amounts are required.

After trying many agents for their effect on hemolysis of blood and for their effect on vision through a cystoscope, I selected the class of hexitols, or hexatomic alcohols, for further investigation. Dulcitol was not sufficiently soluble to form a stable isotonic solution, and mannitol was not sufficiently soluble to form a concentrated (for example, a ten-fold concentrated) solution, but sorbitol was found to have very favorable solubility properties. Sorbitol and mannitol solutions were found to be heat-sterilizable without development of color, and were found to be stable to the various known pyrogen destroying technics (for example, Campbell and Cherkin, Science, 102: 535–536, 1945). Sorbitol and mannitol were already known to be non-irritating, nontoxic, non-ionized, and non-sticky.

When studying in detail the effect of sorbitol on hemolysis of erythrocytes, it was found that sorbitol could be diluted to at least 60 percent of isotonic without causing any hemolysis and even without adversely affecting the red cell fragility. This non-hemolytic effect of hypotonic sorbitol was surprising, and the data will soon be reported in the American Journal of Clinical Pathology.

The optical elegance of several solutions was compared by urologists on the basis of the ease of reading newsprint through the flowing solution by use of a cystoscope and found to be excellent with isotonic sodium chloride, 0.6 isotonic sorbitol, distilled water, 0.6 isotonic glycine, and isotonic glycine. The optical elegance was somewhat reduced with 0.6 isotonic sodium chloride and isotonic sorbitol. The optical properties were poor with all mixtures of glycine and sorbitol.

Since a 0.6 isotonic sorbitol solution is not only entirely satisfactory but is in some respects preferable to an isotonic sorbitol solution, it is possible to prepare a ten-fold concentrate which is pyrogen-free and sterile and which can be diluted with fresh distilled water just before use. The availability of a ten-fold concentrate is a considerable economic advantage to the consumer because only one liter of concentrate need be prepared, tested, and distributed to provide ten liters of irrigation fluid for the patient.

In studying the properties of a ten-fold concentrate (six times isotonic sorbitol), it was noticed that precipitation or crystallization would ofen occur at low temperatures, and I found that this undesirable crystallization could be prevented by substituting mannitol for a small portion of the sorbitol. Consequently, when a concentrate is to be prepared, my preferred formula contains one part of mannitol for every five parts of sorbitol.

Irrigation fluids, prepared according to the three specific examples which are listed later, have been tested extensively by practicing urologists on approximately five hundred patients. Particular clinical advantages reported by the urologists are: no intravascular hemolysis with the usual resulting toxic reactions; no febrile or pyrogen reactions; no interference with vision, except for an occasional temporary cloud due to unhemolyzed red cells; and no undesirable physical properties. One unexpected advantage was that the blood clots formed during cystic and prostatic surgery, in the presence of the hexitol solution, were so weak and unfirm that they readily passed through the irrigation equipment without clogging and causing a stoppage of the irrigation. When a blood clot clogs the irrigation system, the continuous irrigation ceases, vision is soon obscured, and the entire equipment must be removed, cleaned, and reinserted, with considerable delay to the surgery and danger to the patient. Consequently, this property of the hexitol solution to form a fragile clot is a very important but unexpected adavantage.

The effect of sorbitol and mannitol on the blood clotting mechanism was studied in the laboratory by using purified clotting components in the presence of 3.28 percent sorbitol or mannitol. It was found that the hexitol affected only the conversoin of fibrinogen to fibrin. The hexitol caused only a slight prolongation of the clotting time, but caused the resulting fibrin clot to have virtually no tensile strength and to be generally mushy.

In the following examples, the ingredients of the solution are expressed in terms of grams per liter of solution. The solutes and the water must be obtained free of pyrogens or must be rendered free of pyrogens. The completed solution should be filled into appropriate containers, which should be sealed hermetically, and should be sterilized by heat within at the most four hours after preparation of the solution. The alkyl parahydroxybenzoates are used, optionally, as preservatives or as bacteriostatic or fungistatic agents. In the ten-fold concentrate, three of the alkyl parahydroxybenzoates are used because no one of these preservatives is sufficiently soluble to be used in an effective concentration.

EXAMPLE 1

| | Gm. per 100 ml. |
|---|---|
| Sorbitol | 3.27 |
| Methyl parahydroxybenzoate | 0.0005 |

EXAMPLE 2

| | Gm. per 100 ml. |
|---|---|
| Mannitol | 3.27 |
| Methyl parahydroxybenzoate | 0.0005 |

The above two solutions, when prepared sterile and pyrogen-free, are each suitable for use directly as an irrigation fluid.

EXAMPLE 3

| | Gm. per 100 ml. |
|---|---|
| Sorbitol | 32.7 |
| Methyl parahydroxybenzoate | 0.005 |
| Propyl parahydroxybenzoate | 0.001 |
| Butyl parahydroxybenzoate | 0.001 |

The above solution, when diluted with nine parts of fresh pyrogen-free distilled water, is suitable for use as an irrigation fluid.

EXAMPLE 4

| | Gm. per 100 ml. |
|---|---|
| Sorbitol | 27.3 |
| Mannitol | 5.46 |
| Methyl parahydroxybenzoate | 0.005 |
| Propyl parahydroxybenzoate | 0.001 |
| Butyl parahydroxybenzoate | 0.001 |

The above solution, when diluted with nine parts of fresh pyrogen-free distilled water, is suitable for use as an irrigation fluid.

Having thus described my invention, what I claim and desire to secure by Letters Patent is:

1. A concentrated solution intended to be diluted for use as an irrigation fluid in the urinary tract comprising from 4.6 percent to 46 percent of a mixture of sorbitol and mannitol in water.

2. In the method of performing urological and gynecological surgery, the step of irrigating the surgical field with a non-hemolytic, nontoxic, optically clear *3.27* [4.6] percent to *5.46* [46] percent aqueous solution of a hexitol selected from the group consisting of sorbitol and mannitol.

References Cited in the file of this patent or the original patent 2,531,097 Alpert et al. Nov. 21, 1950

OTHER REFERENCES

Speel: Am. J. Pharmacy, pages 134–138.

Atlas Sorbitol Pamphlet, 1947, Atlas Powder Co., pp. 1–4, 6.